US005189662A

United States Patent [19]

Kleine-Altekamp

[11] Patent Number: 5,189,662

[45] Date of Patent: Feb. 23, 1993

[54] TRANSMISSION NETWORK HAVING ELECTRONICALLY SWITCHABLE NODES FOR SWITCHING SIGNAL PATHS AND A METHOD OF CONTROLLING SAID NETWORK

[75] Inventor: Harold Kleine-Altekamp, Bietigheim, Fed. Rep. of Germany

[73] Assignee: Alcatel N.V., Amsterdam, Netherlands

[21] Appl. No.: 470,178

[22] Filed: Jan. 25, 1990

[30] Foreign Application Priority Data

Jan. 26, 1989 [DE] Fed. Rep. of Germany ....... 3902243

[51] Int. Cl.[5] .............................................. H04J 3/14

[52] U.S. Cl. .......................................... 370/16; 370/17; 370/14; 370/54; 371/3; 371/15.1; 340/825.06

[58] Field of Search .................. 371/11.1, 3, 15.1, 8.1, 371/8.2; 370/16, 80, 94.1, 60, 107, 17, 14, 53, 94.1, 15, 13, 54; 340/825.01, 825.06, 827, 825.02; 379/219, 228

[56] References Cited

U.S. PATENT DOCUMENTS

| | | | |
|---|---|---|---|
| 4,433,411 | 2/1984 | Gefroerer et al. | 370/80 |
| 4,455,645 | 6/1984 | Mijioka et al. | 370/16 |
| 4,494,717 | 1/1985 | Corrie et al. | 371/3 |
| 4,736,393 | 4/1988 | Grimes et al. | 370/107 |
| 4,745,593 | 5/1988 | Stewart | 370/60 |
| 4,747,097 | 5/1988 | Ohya et al. | 370/16 |
| 4,794,590 | 12/1988 | Yano | 370/60 |
| 4,797,875 | 1/1989 | Pospischil et al. | 370/54 |
| 4,811,334 | 3/1989 | Matt | 370/60 |
| 4,841,523 | 6/1989 | Roffinella et al. | 370/94.1 |
| 4,855,993 | 8/1989 | Hamada et al. | 370/16 |
| 4,872,159 | 10/1989 | Hemmady et al. | 370/60 |
| 4,881,220 | 11/1989 | Yomogida et al. | 370/16 |
| 4,884,263 | 11/1989 | Suzuki | 370/16 |
| 5,008,882 | 4/1991 | Peterson et al. | 370/94.1 |
| 5,070,497 | 12/1991 | Kleine-Altekamp | 370/14 |

FOREIGN PATENT DOCUMENTS

| | | |
|---|---|---|
| 0048853 | 4/1982 | European Pat. Off. . |
| 0214398 | 3/1987 | European Pat. Off. . |
| 13150474 | 12/1981 | Fed. Rep. of Germany . |

OTHER PUBLICATIONS

WO-A-9001246 (PCT/DE89/00488).

"Structure of a Communication Network and its Control Computer", I. Cappetti et al., Computer Communications Network and Teletraffic, vol. 22, N.Y., Apr. 4-6, 1992, pp. 1-7.

*Primary Examiner*—Douglas W. Olms
*Assistant Examiner*—Dang Ton
*Attorney, Agent, or Firm*—Ware, Fressola, Van Der Sluys & Adolphson

[57] ABSTRACT

In a transmission network having electronically-controlled switchable nodes, with network path information stored therein, a method is provided to control and monitor established signal paths and to switch the signal paths even in those cases where a central network management is not available, either in the set-up phase or due to a failure. In this method, at both end points of the path, an identification is inserted into the digital signal to be transmitted, which identifies the source node of the path and its input port as well as the destination node of the path and its output port. This identification is received and checked in the subsequent network node and is passed on to the respective next network node. The latter also checks the received identification and sends it to the next network node in the destination direction. In this way, the established path is monitored, and alternative paths can be rapidly set up in the event of a failure or disturbance.

22 Claims, 1 Drawing Sheet

TRANSMISSION NETWORK HAVING ELECTRONICALLY SWITCHABLE NODES FOR SWITCHING SIGNAL PATHS AND A METHOD OF CONTROLLING SAID NETWORK

BACKGROUND OF THE INVENTION

1. Field of the Invention

The invention relates to transmission networks, and more particularly to a network having electronically switchable nodes for switching paths and a method of controlling the network.

2. Description of the Prior Art

Conventional line-bound transmission networks include repeater stations, at which digital signals can be switched manually in a mechanical distributing frame.

SUMMARY OF THE INVENTION

The development goal set by network operators is to create electronically-controlled switching distributors—also referred to as cross-connects—for the repeater or operating stations of the transmission network. With these, in the case of a failure of a path, an alternative path can be switched very quickly in the transmission network. In this way, the availability of paths is increased. In addition, leased lines can be switched and paths can be simply released for maintenance purposes. The switching of transmission paths requires an effective so-called network management, which is carried out, for example, by a central computer.

A primary objective of the present invention is to carry out the establishment and switching of transmission paths in an electronically controlled manner, even in a set-up phase, in which a central network management is not yet available, or in the event of failures of a central computer.

Another objective of the present invention is to control and monitor established signal paths in a transmission network and to rapidly change to a new path in the event of a failure in a path.

These objectives are achieved in a circuit switched transmission network having switchable nodes capable of switching digital signal paths wherein the network nodes have sufficient information stored therein to be able to switch to a new digital signal path in case of changes or disturbances in an established path without the need of being controlled by a control network management computer. The transmission network is controlled by a method in which at both end points of the path, an identification that identifies the source network node of the path and its input port, as well as the destination network node of the path and its output port, is inserted into the digital signal to be transmitted, in the subsequent network nodes along the path, said identification is received, checked and passed onto the respective next network node, and that said next network node, too, checks the received identification and sends it to the next network node in the destination direction.

Using the above-described nodes and method, the established paths can be monitored and controlled. Disturbances in the path are quickly detected and a new path established, using the information stored in each node, without the need for central control.

An advantage of the method according to the invention is represented by the fact that it makes it possible to transport information about the individual digital paths from network node to network node and to achieve an effective network management by means of appropriate evaluations in each node.

DESCRIPTION OF THE DRAWING

An exemplifying embodiment of the invention is explained below with reference to the drawing, in which, in schematic representation.

DESCRIPTION OF THE INVENTION

Figure 1:
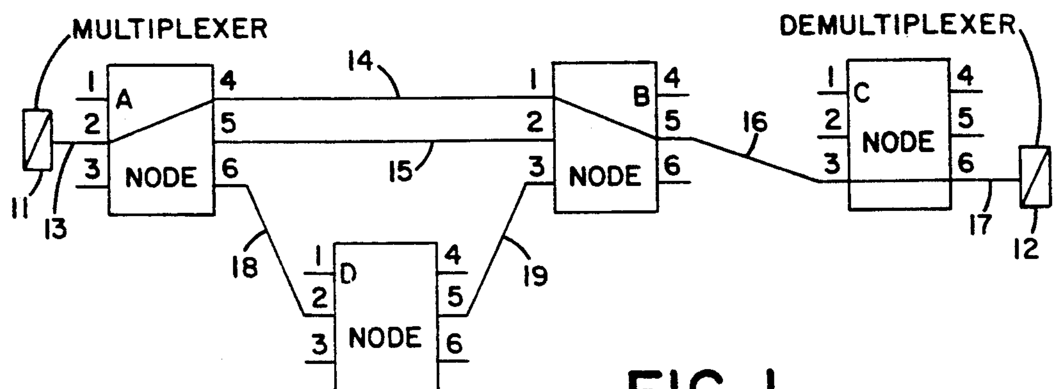
FIG. 1 shows a transmission network in normal operation.

Each digital signal is provided with an identification at the beginning of a digital path. This identification includes information on the source and destination of the digital signal to be transmitted on the path.

The identification has the following structure:

| | |
|---|---|
| Information byte: | 8 bits |
| Number of the transmitting node (source node) | 16 bits |
| Number of the input port of the transmitting node | 16 bits |
| Number of the receiving node (destination node) | 16 bits |
| Number of the output port of the receiving node | 16 bits |

The information byte has the following content:

| | MSB | | | | | | | LSB |
|---|---|---|---|---|---|---|---|---|
| Bit No. | 7 | 6 | 5 | 4 | 3 | 2 | 1 | 0 |
| | R | DS | — | — | — | — | RB | T |

The least significant bit (LSB), Bit No. 0, in the information byte indicates whether the digital signal is a test signal or operating digital signal as follows:

T="0": Operating digital signal

T="1": Test signal

The value of Bit No. 1, a reserve bit (RB), within the information byte is inserted at the source node and is evaluated in the destination node. The purpose of this reserve bit will be discussed subsequently.

The set-up direction of a data path is indicated in Bit No. 7 of the information byte:

R="0": The destination node is the master

R="1": The source node is the master

In Bit No. 6 of the information byte, the destination node is informed that it is to switch through a pre-stored path. This bit is required only for the case in which a digital signal with an unknown frame structure is to be transmitted, as will be explained later:

DS="0": No switching in the destination node

DS="1": Switching in the destination node

The above described identification structure is transmitted along with synchronization information in the following manner: For synchronization, a sequence of 128 bits with the significance "1" is transmitted, for example (stop position), followed by 8 bits with the significance "0" (start). The 72 bits of the identification are then transmitted, starting with the LSB of the information byte. This sequence of stop position, start, and identification is repeated cyclically.

The digital signals to be transmitted over the network usually have a frame structure as defined by one of the CCITT recommendations G.704, G.742 or G.751. In the case of digital signals with a frame structure according to one of the CCITT recommendations, the transmission of the identification is carried out using a bit in each frame that is free for national use. The bit or bits available for this purpose are as follows:

2 Mbit/s: Bits 4–8 of each frame that do not contain a frame password (corresponding to G.704)

8 Mbit/s: Bit 12 in each frame (corresponding to G.742)

34 Mbit/s: Bit 12 in each frame (corresponding to G.751)

140 Mbit/s: Bits 14–16 in each frame (corresponding to G.751)

The bit sequence representing synchronization and the identification is thus transmitted one bit at a time by inserting the bit in the digital signal in the bit position that is free for national use. Thus, it takes 200 frames to transmit the synchronization and identification bits.

The synchronization and identification bits are transmitted as a CMI-coded data flow, asynchronously and with oversampling in the respective reserve bit. Because of the asynchronous transmission, no frame clock of the digital signal is required in the reserve bit. It is thus possible to use existing multiplexer equipment, in which an access to the bit via the plug connector of an operating station is possible, but which do not supply a frame clock, for the insertion of an identification.

The CMI-coding is used for bit synchronization on the reception side. In the CMI-coding, the binary values are represented as follows:

Binary "0": "01"

Binary "1": "00" and "11" alternating

The transmission rate of the identification is adjusted to the frame repetition rate of the particular hierarchy plane. It is selected such that a more than five-fold oversampling takes place. By means of a multiple evaluation of the signal on the reception side, individual transmission errors can thus be corrected.

The following transmission rates for the identification are obtained:

| Hierarchy Plane | Frame Rate | Rate of the Free Bit | Transmission Rate of the Identification | Sampling Ratio |
|---|---|---|---|---|
| 2 Mbit/s | 8.00 kHz | 4.00 kHz | 600 Baud | 1:6.7 |
| 8 Mbit/s | 9.96 kHz | 9.96 kHz | 1200 Baud | 1:8.3 |
| 34 Mbit/s | 22.38 kHz | 22.38 kHz | 2400 Baud | 1:9.7 |
| 140 Mbit/s | 47.56 kHz | 47.56 kHz | 4800 Baud | 1:9.9 |

For the frame duration of the identification, the following values are obtained for a frame length of approximately 200 bits:

2 Mbit/s: 0.67 s

8 Mbit/s: 0.33 s

34 Mbit/s: 0.17 s

140 Mbit/s: 0.08 s

For the case in which a network operator uses the free bit for other purposes, the reserve bit, RB, of the information byte of the identification is used to transmit the information that was in the free bit. This bit can be placed or read in each network node with the information customarily transmitted in the free bit in the particular network. Since the transmission rate for this free bit information is reduced, one should preferably use, for transmission of the identification, a bit of the digital signal via which only quasi-static signals are transmitted (e.g., error messages, alarms, and the like). The maximum delay in the case of a change in the signal (alarm) is equal to the frame duration of the identification in question.

In this way, a transparent transmission of quasi-static signals via the network is ensured, although the byte originally intended for this purpose is used within the network for transmission of the identification.

If digital signals showing an unknown frame structure are transmitted (e.g., video-coded signals), then the identification cannot be inserted into the signal. The advantages of the identification described here can be used for paths of this type by the fact that the set-up of the path is carried out with a digital signal of known frame structure, including the identification. As soon as the path has been switched in the network and has been checked by means of the identification, the actual useful signal with unknown frame structure is transmitted via this path.

Figure 2:
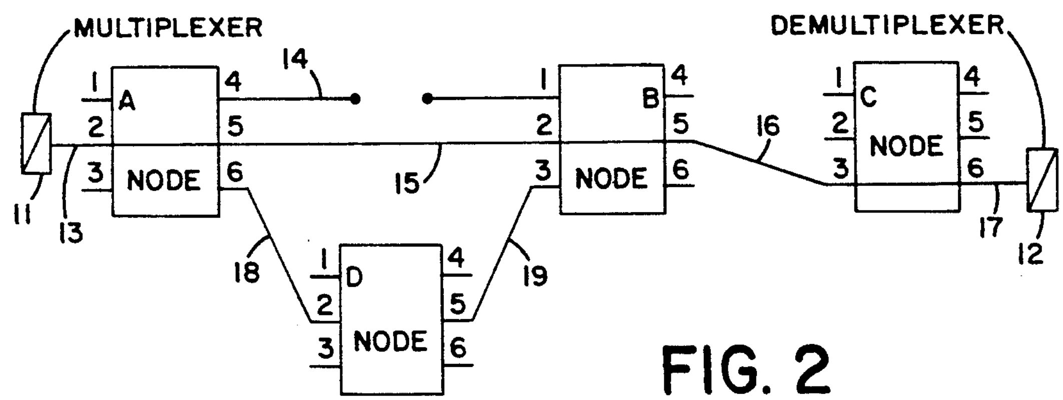
FIG. 2 shows the transmission network according to FIG. 1, in which a path between two network nodes has been interrupted, but an alternative path is present between these two network nodes.
Figure 3:
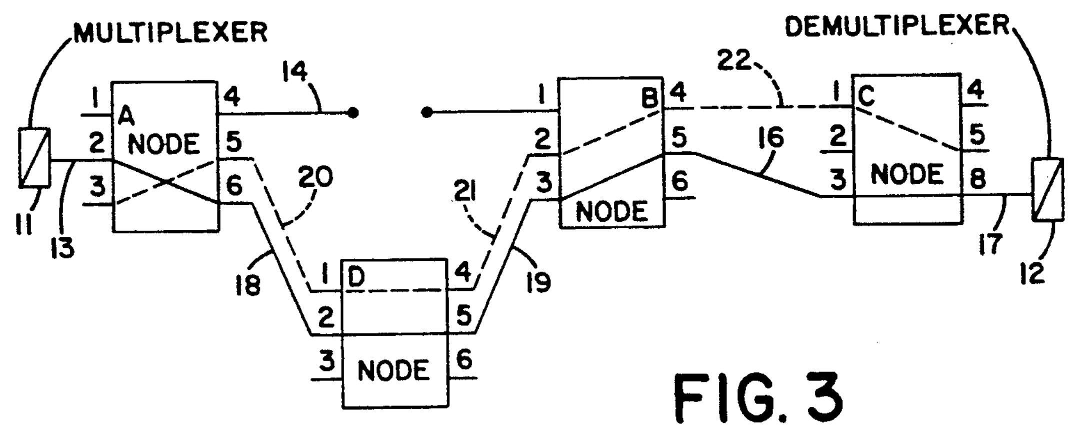
FIG. 3 shows the network according to FIG. 1, in which a path between two network nodes has failed and no alternative path is present between these two network nodes.

FIGS. 1–3 show a transmission network, via which a digital data path is to be set up between a first instrument—e.g., a multiplexer—11 and a second instrument—e.g., a demultiplexer—12. The transmission network contains network nodes A, B, C and D which in each case are equipped with ports 1–6. These ports 1–6 are both signal inputs and signal outputs, since the data path is usually bidirectional. The network nodes A–D are connected with each other and with the instruments 11 and 12 by lines 13–22.

To set up a new path, appropriate switching orders are given to all network nodes involved. This can be done in the usual manner, e.g., via an operating station, or via a network management computer, if such a station is in operation.

If the path shown in FIG. 1 is to be set up, then the network node A receives the order to connect port 2 with port 4, the network node B receives the order to connect port 1 with port 5, and the network node C receives the order to connect port 3 with port 6. The through connection in the end network nodes A and C is carried out only if a digital signal with a known frame structure is to be transmitted. If, on the other hand, a digital signal with an unknown frame structure is to be switched, then, initially, the switching is not yet carried out in the end network nodes A and C, but the switching order is only prestored.

An identification is then repeatedly and continuously inserted into the digital signal at one of the two end points of the path. This end point represents the source node (master) of this path, as indicated by a "1" in bit 7 of the information byte of the identification. The identification has the following structure, with the information byte being abbreviated to show only Bit No. 7 for indicating the master node:

[Transmitting Node No., Input Port No.] [Receiving Node No., Output Port No.] [Bit No. 7]
If Bit No. 7 is "1", the source node is master.
[Transmitting Node No., Input Port No.] [Receiving Node No., Output Port No.] [Bit No. 7]
If Bit No. 7 is "0", the destination node is master.

When node A is the master node, the identification will be as follows for FIG. 1:

| | |
|---|---|
| [A, 2] [C, 6] 1 | Direction from A to C |
| [C, 6] [A, 2] 0 | For the opposite direction |

When the subsequent network node receives this identification, it will initially transmit in the opposite direction, i.e., in the direction of the source or origin network node, its own node identification number, together with the received node identification number of the source node.

| | | |
|---|---|---|
| Example: | [A, 2] [C, 6] 1 | Direction from A to C |
| | [B, 1] [A, 2] 0 | For the opposite direction from node B |

The source node (master) A now recognizes that the set-up of the path has advanced to the next node B.

As long as node B has not connected its port 1 to port 5, it does not transmit the identification [A, 2] [C, 6] 1 to port C, but sends back to node A the confirmation identification [B, 1] [A, 2] 0 and does this repeatedly until it receives from a node behind B (i.e., from node C) an identification inserted in a digital signal to be transmitted towards node A via the path.

In the example shown in the table below, node B sends the identification [B, 1] [A, 2] 0 twice towards node A, and then node B connects port 1 to port 5. Consequently, node B, in turn, in accordance with the path connected in series, transmits the identification [A, 2] [C, 6] 1, which is repeatedly received form node A, in the forward direction to the subsequent node C.

At this point, node C does not yet send a confirmation, so node B repeats the identification [B, 1] [A, 2] 0 to node A once more. Node C then sends its own confirmation identification [C, 6] [A, 2] 0 towards node B. Node B, receiving the confirmation, then passes it on to the source node A, which recognizes that the path has grown further in the direction of the destination node by another transmission section. If the source node receives an identification with the number of the destination node, then the path is set up correctly.

Nodes A and C continue to repeatedly send identifications [A, 2] [C, 6] 1 and [C, 6] [A, 2] 0 respectively after set-up for continued path monitoring.

The complete course of the exchange of identification telegrams in the set-up of a path is shown in the following table:

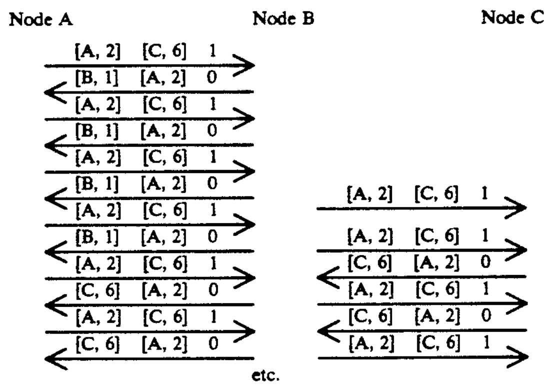

The above table does not represent an exact timing diagram, but only shows the identifications that are sent by each node and how the identification changes during establishment of the path.

It must be remembered that each node transmitting an identification does this continuously, and not in response to the receipt of an identification. After setting up a path, only the two nodes at the ends of the path send identifications by inserting the identification into the transmission signal. All other nodes function to through-connect this transmission signal, including the identification. In order to supervise the path, the intermediate nodes monitor the through-connected identification.

For the case in which a digital signal with a known frame structure is to be switched through, the identifications are sent from end network node to end network node as described. If, on the other hand, a digital signal with an unknown frame structure is to be switched through, then the switching into the end network node of the path must still be carried out. This is done in the following manner:

The master network node, which has recognized the correct switching-through of the path by means of the identification—in the present example, this is the network node A—sets Bit. No. 6 of the information byte of the identification to "1". If the destination node C receives this identification, then it will carry out the appropriate switching, i.e., it will connect its port 3 with port 6. The result of this is that the network node C can no longer insert any identification. As soon as the network node A receives no further identification after that, it will also carry out the necessary switching, i.e., it will connect its port 2 with port 4. In this way, the path for the signal with an unknown frame structure has been established.

If the digital path is interrupted for any reason, an alternative path must be established. This is done in the following manner:

In order to keep the failure time in the case of an interruption of a digital path as short as possible, free paths are usually maintained in a data transmission network, which can be used as an alternative path in such a case.

In the case of an interruption, an alternative circuit of this type can be established via free paths. This will be illustrated by means of an example:

Let the digital path between port 2 of the network node A and port 6 of the network node C, explained with reference to FIG. 2, be interrupted, for example, by a disturbance in the line 14 between network nodes A and B for both transmission directions. This is recognized in both network nodes by monitoring of the digital signal. The network node that is acting as a master for the failed section, i.e., the node transmitting an identification with the direction bit="1" in the information byte in this section, has the task of initiating an alternative path. In this example, it is the network node A; in the case of a failure of the path between network nodes B and C, it is the network node B.

The shortest possible path is to be sought for the alternative circuit, in order not to occupy an unnecessarily large number of free lines. Thus, the network node A initially attempts to use a free path between network nodes A and B, and only if this is not possible will it seek a way via a different network node.

An alternative path between network nodes A and B is available:

the control of each network node has information at least on what paths, i.e., the ports, by means of which it is connected to its adjacent node. The control of the network node A recognizes that the line 15 leads from its port 5 to the network node B and that it is also available as an alternative path, because, for example, only a test signal is transmitted via this, and the transmission quality is good. After that, the ports 2 and 5 are connected in the network node A.

The network node B receives at its port a signal with the identification that has been received before the disturbance at port 1. From this its control recognizes that the network node A has switched to an alternate line. After that, the ports 2 and 5 in the network node B are connected with each other, as a result of which the connection between network nodes A and C is reestablished, as shown in FIG. 2.

No alternative path is available between network nodes A and B:

in this case, the control of the network node A attempts to set up the alternative path via a different network node. In order to establish the best possible alternative path, it will use the network information which may be gradually collected on the basis of the identifications.

This is because, in the switching of the different paths, information about the additional network nodes through which these paths lead can be stored in a network node. With this information, its control has data available on the structure of the network in its vicinity, so that it can search for a favorable transmission path.

If, for example, a path leads through a port of the network node A, which path also leads through the network nodes D, B and C (shown as broken lines 20, 21 and 22 in FIG. 3), then it is known to the control of the network node A that network nodes B and D are adjacent and that it can reach the network node B, in principle, via the network node D. In this case, a free line 18 to the network node D is used by the control of network node A, and port 2 is connected to port 6 in network node A.

In network node D, the digital signal is received at port 2 and it is recognized that the network node C is indicated as a destination in the identification. It is also known to the control of network node D that a path exists between network nodes B and C, since this fact was stored during set-up of the path shown as a broken line. It therefore sends the signal coming from network node A onto network node B, by connecting port 2 and port 5 of network node D. Its own identification is initially sent back to network node A, as is also the case during the set-up of a path.

In network node B, a digital signal is received at port 3 with the identification that it received at its port 1 before the disturbance. Its control recognizes from this that the network node A has switched to an alternative path. After this, through the control of network node B, its port 3 is automatically connected with its port 5, whereby the path between network nodes A and C is restored, as shown in FIG. 3.

Because, in this case, the alternative path occupies a larger number of path sections than the original path, one should switch back to the original path after the disturbance has been eliminated and the path is again available.

If only one transmission direction is interrupted in a digital path, a bidirectional alternative path will always be produced, because the forward and reverse direction of a path are considered as related in each case.

If the control of a network node recognizes at one input that the path has been interrupted, then it will send a so-called AIS (Alarm Indication Signal) in the opposite direction. The controls of the network nodes on both sides of the interruption thus recognize that a disturbance is present. The control of the network node responsible for the section can then initiate an alternative path, in exactly the same way as was described for the case in which both transmission directions have failed.

The advantages of the method described above lie primarily in the fact that it makes possible an independent network management without an extensive data exchange from network node to network node. In addition, rapid alternative switching becomes possible, because it is not necessary to pass through several communication stages to a central or regional network management. The transmission of the identification takes place via free bits of the digital signals to be transmitted, in which case these can continue to be used for quasi-static messages. The transmission of a static identification—in this case, the identification is formed once at the beginning of a digital path and is only read and passed through during the path set-up—and the transmission method used make possible an evaluation of the identification at the ports, without the need to provide the assemblies in question with processors.

What is claimed is:

1. A method of monitoring a digital transmission network of the type having a plurality of switchable nodes in which switching orders are executed to establish circuit-switched signal paths for digital signals, said method characterized in that:

each of two end nodes of a circuit-switched path, defined by a plurality of nodes, inserts into the digital signal to be transmitted over the circuit-switched signal path to the respective other end node, an identification signal which identifies the end node inserting the identification signal as a source node of the circuit-switched signal path and one of a plurality of input ports of the source node as an input port for the digital signal, and the last node of the circuit-switched signal path as a destination node and one of a plurality of output ports of the destination node as the output port for the digital signal, in intermediate nodes the circuit-switched signal path, said identification signal is received, checked and passed on to a respective next intermediate node, and that said next intermediate node, also, checks the received identification signal and sends it to a further next intermediate node in the direction of the destination, and that all nodes perform a monitoring function to detect circuit-switched signal path disturbances.

2. A method according to claim 1, characterized in that the identification signal is transmitted in a predetermined bit of successive frames of the digital signal to be transmitted.

3. A method according to claim 2, characterized in that the identification signal is transmitted in CMI-coded form and asynchronously with oversampling.

4. A method according to claim 1, characterized in that the identification signal is transmitted in a predetermined bit of successive frames of the digital signal, via which only quasi-static signals are transmitted.

5. A method according to claim 2, characterized in that the predetermined bit of the frames of the digital signal to be transmitted is transmitted as a part of the identification signal and is reinserted into the frames of the digital signal at the end of the circuit switched signal path.

6. A method according to claim 1, characterized in that, during the setting up of a circuit-switched signal path, each intermediate node sends its identification signal to one of the end-point nodes of the digital path, so that the course of the digital path is known at the end-point network node.

7. A method according to claim 6, wherein the identification signal of a particular intermediate node is stored in intermediate nodes along the digital path between the particular intermediate node and the end nodes.

8. A method according to claim 1, characterized in that the nodes continuously check the identification signal received and in the event of a sensed failure initiates switching to an alternative circuit-switched signal path.

9. A method according to claim 8, wherein one of said end nodes is designated a master node and is assigned the responsibility to initiate switching to an alternative circuit-switched signal path.

10. A method according to claim 1, wherein the identification signal contains a plurality of bits, said bits being transmitted one at a time in a predetermined bit position of successive frames of the digital signal, said predetermined bit position is usually a free bit or is used for transmission of bits of quasi-static signals which are replaced by bits of the identification signal, and said replaced bits are transmitted at a lower rate as one bit of the identification signal and are reinserted into the predetermined bit position at the end of the circuit-switched signal path.

11. A method according to claim 1, wherein the identification signal additionally includes an information byte containing bits indicating if the digital signal is a test signal or an operating signal, whether the source or destination node is a master node, whether there is switching in the destination node, and a bit for transmitting a replaced digital signal bit.

12. A transmission network, comprising:

a plurality of switchable nodes; and a plurality of circuit-switched transmission lines connected between said nodes, selected ones of said nodes and lines forming a circuit-switched signal path between two end nodes and having intermediate nodes, said end nodes each being capable of generating an identification signal which identifies a source node of the path and an input port of the source node, as well as a destination node of the path and an output port of the destination node, and inserting said identification signal into a digital signal to be transmitted, the intermediate nodes being capable of receiving and checking the identification signal and passing the identification signal to the next intermediate node toward the destination node, all nodes being capable of performing a monitoring function to detect path disturbances.

13. A transmission network as described in claim 12, wherein the identification signal is transmitted in a predetermined bit of successive frames of the digital signal to be transmitted.

14. A transmission network as described in claim 13, wherein the identification signal is transmitted in CMI-coded form and asynchronously with oversampling.

15. A transmission network as described in claim 12, wherein the identification signal is transmitted in a predetermined bit of successive frames of the digital signal, via which only quasi-static signals are transmitted.

16. A transmission network as described in claim 13, wherein the predetermined bit of the frames of the digital signal to be transmitted is transmitted as a part of the identification signal and is reinserted into the frames of the digital signal at the end of the path.

17. A transmission network as described in claim 12, wherein during, the setting up of a path, each node sends its identification signal to one of the end-point nodes of the path, so that the course of the path is known at the end-point network node.

18. A transmission network as described in claim 17, wherein the identification signal of a node is stored in intermediate nodes along the path between the node and the end nodes.

19. A transmission network as described in claim 12, wherein the nodes continuously check the identification signal received and in the event of a sensed failure initiates switching to an alternative path.

20. A transmission network as described in claim 19, wherein one of said end nodes is designated a master node and is assigned the responsibility to initiate switching to an alternative path.

21. A transmission network as described in claim 12, wherein the identification signal contains a plurality of bits, said bits being transmitted one at a time in a predetermined bit position of successive frames of the digital signal, said predetermined bit position is usually a free bit or is used for transmission of bits of quasi-static signals which are replaced by bits of the identification signal, and said replaced bits are transmitted at a lower rate as one bit of the identification signal and are reinserted into the predetermined bit position at the end of the path.

22. A transmission network as described in claim 12, wherein the identification signal additionally includes an information byte containing bits indicating if the digital signal is a test signal or an operating signal, whether the source or destination node is a master node, whether there is switching in the destination node, and a bit for transmitting a replaced digital signal bit.

* * * * *

UNITED STATES PATENT AND TRADEMARK OFFICE
CERTIFICATE OF CORRECTION

PATENT NO. : 5,189,662

DATED : February 23, 1993

INVENTOR(S) : H. Kleine-Altekamp

It is certified that error appears in the above-identified patent and that said Letters Patent is hereby corrected as shown below:

On the title page:
At INID Sec. 75, please change "Harold" to --Harald--.

At column 8, line 48, after "nodes", please insert --of--.

At column 10, line 22, please delete the comma after "during".

Signed and Sealed this

Thirtieth Day of November, 1993

*Attest:*

BRUCE LEHMAN

*Attesting Officer*

*Commissioner of Patents and Trademarks*